May 13, 1924.  1,493,468
C. C. CAMP
SIGNALING DEVICE FOR AUTOMOBILES
Filed Aug. 29, 1921  2 Sheets-Sheet 1
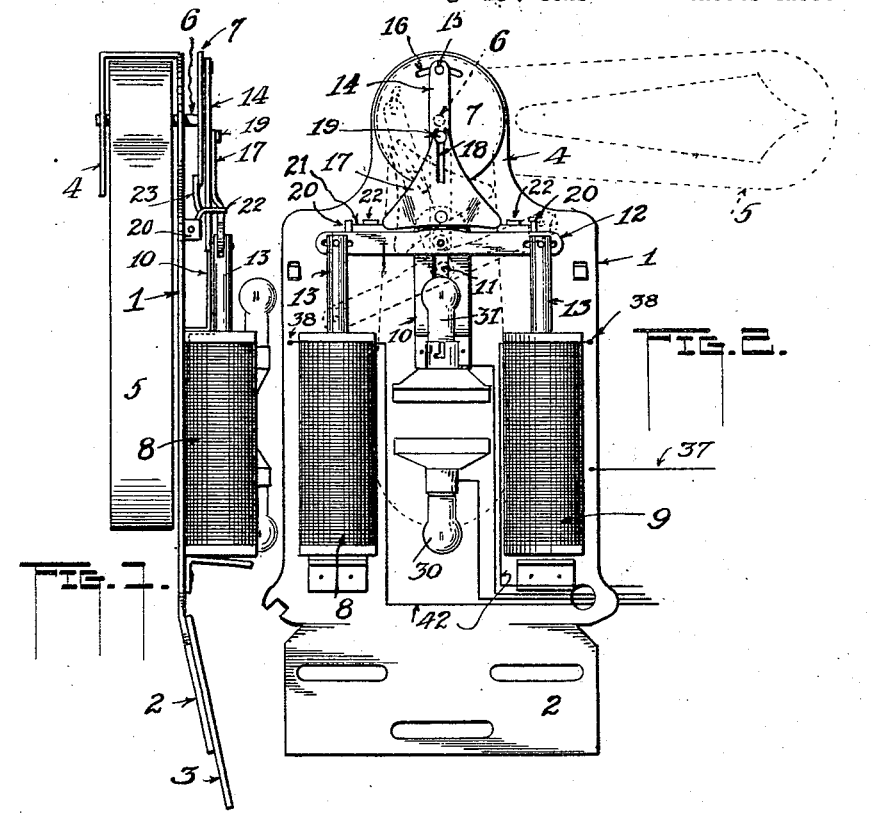
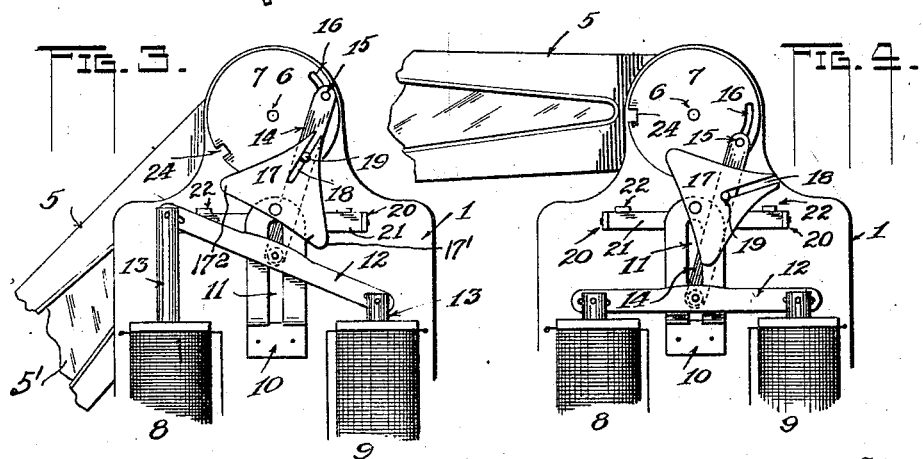
Inventor
C. C. Camp,
By L. M. Thurlow
Attorney May 13, 1924.
C. C. CAMP
SIGNALING DEVICE FOR AUTOMOBILES
Filed Aug. 29, 1921
1,493,468
2 Sheets-Sheet 2
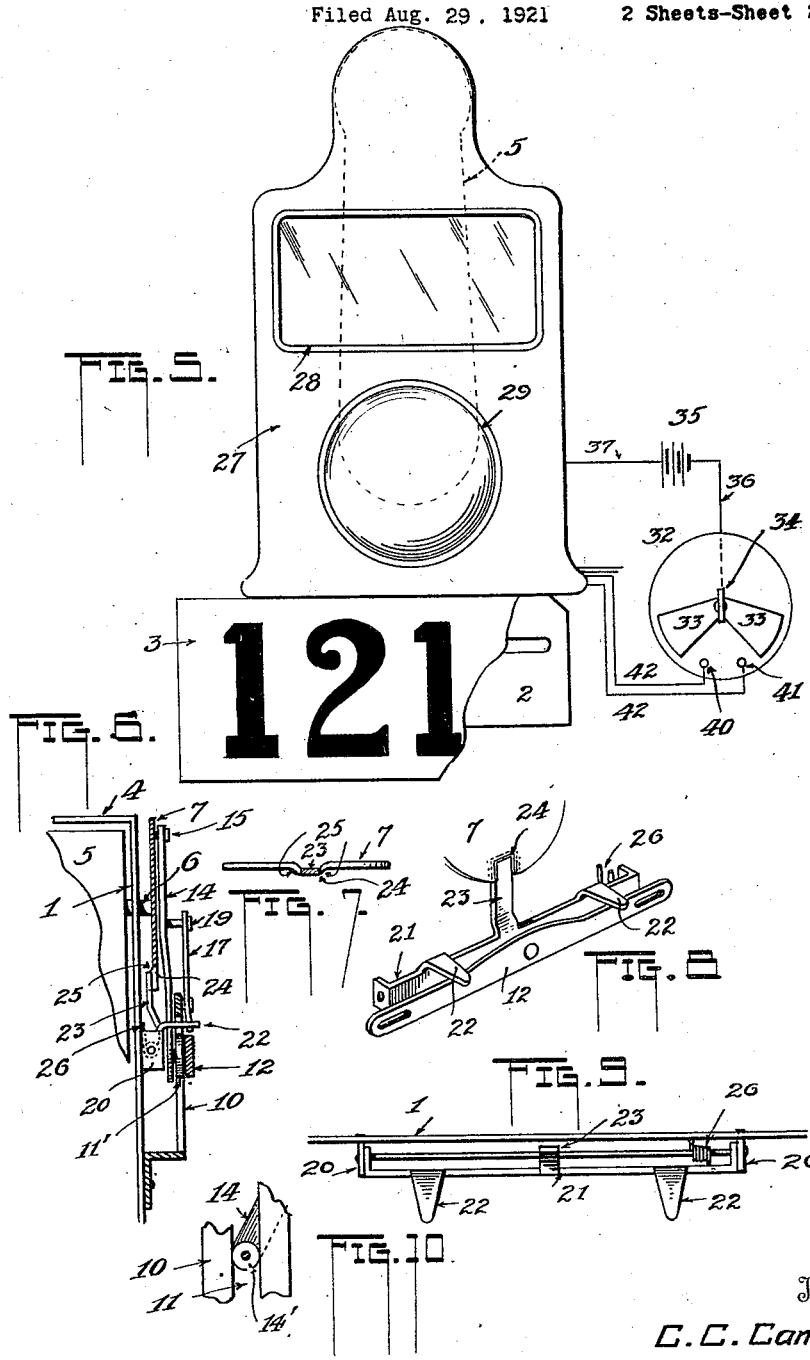

Patented May 13, 1924.

1,493,468

UNITED STATES PATENT OFFICE.

CARL C. CAMP, OF PEORIA, ILLINOIS, ASSIGNOR TO PEORIA AUTO. SIGNAL CO., A CORPORATION OF ILLINOIS.

SIGNALING DEVICE FOR AUTOMOBILES.

Application filed August 29, 1921. Serial No. 496,734.

*To all whom it may concern:*

Be it known that I, CARL C. CAMP, a citizen of the United States, residing at Peoria, in the county of Peoria and State of Illinois, have invented new and useful Improvements in Signaling Devices for Automobiles; and I do hereby declare that the following is a full, clear, and exact description of the invention, which will enable others skilled in the art to which it appertains to make and use the same.

This invention relates to a signaling device for automobiles, being directed more particularly to a signal of the semaphore type.

An object of the invention is the provision of a signal for attachment to a vehicle, preferably at the rear thereof, the same having an arm adapted to be thrown to either one of two positions for signaling the direction in which said vehicle is to turn, the same being operated electrically.

Another object of the invention is that of providing a semaphore arm that in its neutral or "off" position will be locked against accidental movement induced by the swaying or jarring of the vehicle.

Another object is that of providing a peculiar form of mechanism in an electrically operated signal which includes two solenoids one of which imparts an initial movement to a semaphore arm raising it part way when an electric circuit is closed through one of said solenoids followed by the completion of movement of the arm to its proper signaling position by and due to the influence exerted by the other solenoid.

In the appended drawings:

Figure 1 is a side elevation of my signal with its cover removed.

Figure 2 is a front elevation of the same.

Figures 3 and 4 are likewise front elevations of the invention showing two different positions of the parts.

Figure 5 is a front elevation of the signal as it appears with its covering case in position.

Figure 6 is a side elevation of some of the working parts of the signal.

Figure 7 shows the lower or under edge of a locking member.

Figure 8 shows, in perspective, certain parts entering into a locking arrangement of a semaphore arm.

Figure 9 is a plan of the same; and,

Figure 10 is a front elevation of parts shown in Figures 2, 3 and 4.

The device includes a plate 1 as a support for the operating parts of the signal, an extension 2 at the lower end thereof serving as a place of attachment for the license plate 3, Figure 5, particularly when the device is used at the rear of the vehicle.

The upper end of the plate terminates in a rearwardly recurved extension 4, there being pivotally hung between the plate and the extension an arm 5 to act as the signaling portion, the same having a window 5' of transparent material behind which and within said arm is a lamp, not shown. The pivot for the arm is a shaft 6 which at the front side of the plate 1 carries a disc 7 secured centrally and permanently to it which disc is in the nature of a crank-arm. 8 and 9 are two solenoids having an upright position and secured upon the plate 1 in any desired manner in spaced relation.

Affixed to the said plate 1 between the positions of the solenoids is a bracket 10 including a vertical extension spaced from the plate and slotted at 11. 12 is a cross-bar loosely connected by a pin and slot connection at each end to an armature 13 depending into each solenoid and adapted to be drawn thereinto.

At the middle of the length of the cross-bar is pivotally attached at one end a link 14, or pitman, including a roller 14' to travel in the slot 11. The other end of the pitman is connected to the disc 7 by a pin 15 engaging in a slot 16 near the edge of said disc described from the center of support of the latter.

Pivoted to the upper extremity of the bracket 10 is a rocking plate 17 whose edge $17^1$—$17^2$ below its pivot is designed at times to receive contact of said cross-bar. Plate 17 has a slot 18 disposed radially of its pivot into which extends a pin 19 carried by the link 14, the said pin 19, the pin 15, the pivot of the plate 17 and the point of connection of the link 14 with the cross-bar 12 all being in line with one another in the normal position of the parts of the device shown in Figure 1, the arm 5, due to gravity, hanging directly downward.

The weight of the said arm maintains the armature 13 in the elevated position shown in said Figure 1 through the disc 7 and link 14, the cross-bar 12 being held in close proximity to the lower edge of the plate 17.

The plate 1 has two spaced extensions 20, Figure 9, between which is pivoted a rocking member 21 having two spaced forwardly projecting fingers 22 which overhang the cross-bar 12, Figures 1 and 8.

Extending upwardly from the said member 21 is a finger 23 lying between the plate 1 and disc 7 whose extremity is adapted to engage in a notch 24 created in the latter, diametrically opposite the slot 16 from the pin 15 of the link 14. The edges 25 of the metal of said disc at said notch are bent rearwardly or in the direction of the said plate 1 as shown in Figure 6.

A spring 26 interposed between the plate 1 and the member 21 tends constantly to move the finger 23 in the direction of said disc and hold it thereagainst. The said edges 25 since bent rearwardly constitute cams, one at each side of the notch, so that as the arm 5 drops to its normal position the disc in turning with it moves the finger rearwardly against the tension of said spring 26. Then as the notch is carried opposite said finger the latter will drop into it due to the said spring 26, locking the said arm 5 preventing its swinging movement.

A covering case 27 for the described mechanism is shown in Figure 5 and may be suitably secured in place upon the plate 1. It has a window at 28 preferably a transparent medium of green color, while 29 indicates a window of red transparent medium which, together with a lamp 30, Figure 2, serves as a "tail light" for the vehicle. The case 27 is open at its bottom and permits the light from the lamp 30 to fall upon the number plate 3 which as shown in Figure 1 is inclined at an angle so that the light can fall directly upon it.

Behind the window 28 is a lamp 31 adapted to be lighted at times to signal caution to a following vehicle but this forms no part of the present invention, but the circuit through the lamp 30, however, is, of course, kept continuously closed.

32 as a whole denotes a switch which may include two arms 33 rigidly related and operated by a finger piece 34 for example. The arms are electrically connected to one side of a source of electric energy such as a battery at 35 as by a wire 36, for instance, the other side of the battery being connected by a wire 37 to one end of each coil of the solenoids 8, 9. As a simple method said wire 37 may be grounded on the plate 1, Figure 2, and the coils of the solenoids may be grounded upon said plate at 38. On the switch are two contacts 40, 41 each of which is connected separately by a wire 42 with one of the said solenoid coils.

In the operation of the device the arm 5 is designed to be thrown to either of two positions the lamp therein (not shown) being lighted in either position automatically.

When it is desired to throw the arm 5 toward the left, Figures 3 and 4, the switch-arms 33, Figure 5, are moved contra-clockwise with the result that one of said arms upon touching the contact 40 will close the circuit through the solenoid coil 9. The core or armature 13 thereof is thus drawn downward. The first action of this downward movement is to tilt the cross-bar upon its fulcrum at the link 14 to cause it to contact with the plate 17 tilting the latter to the right whereupon the pin 19 in its slot is moved in the same direction thereby carrying the pin 15 of the link 14 to the right hand side of the slot 16 of the disc 7. This resulting downward pull upon the link will rotate the disc and the arm 5 through an angle since the said pin 15 has been moved off center with respect to the shaft 6 of the said disc and arm.

Prior to this movement, however, while the link is on center the cross-arm, its fulcrum being fixed for the movement and being able to have no movement save a tilting one, is lifted at its end at the left to engage the finger 22 of the member 21 at the left lifting the latter sufficiently to remove its finger 23 from the notch 24 of the disc releasing the latter. The resulting movement already described then moves the arm 5 but substantially half its distance of travel, Figure 3.

A continued movement of the switch arms 33, whose whole action in its entirety is practically instantaneous, now closes the circuit through the coil of the other solenoid 8 and draws down the core 13 thereof completing the movement of said arm 5, Figure 4, the lamp therein (not shown) being then lighted.

Upon the switch 32 regaining its off position the solenoids release the cores 13 and the arm 5 falls to its lowest point and is automatically locked in that position by the means described.

The broken lines in Figure 2 show the initial position of the operating parts when the switch arms 33 are moved in a clockwise direction to raise the arm 5 to its position at the right as shown in said figure.

The whole office of the plate 17 is to move the link 14 off center in one direction or the other according to which solenoid is first affected in throwing the switch at 32.

The disc 7 may be of a form other than disc form, of course, while including the slot 16 and the locking notch 24 at opposite sides of the center of its support the circular disc form being mere preference. In some of the claims this member will be termed a crank-arm.

The apparatus is susceptible of changes that will easily suggest themselves and these changes may be such as will produce the desired results outlined herein while still lying within the spirit of the invention and the appended claims.

I claim—

1. In a signaling device, a pivotally mounted signaling-arm normally pendant, a crank-arm rigidly related to said signaling arm at the pivot thereof, mechanism operatively engaging and in control of the crank-arm adapted to swing the same in either direction for raising the arm in either direction, said mechanism including two separate devices for operating said crank-arm, a member with which the devices are both operatively connected, and means operated by the member and engaging the crank-arm, and means to selectively operate said devices in successive order for swinging said signaling arm and by which to determine the direction of its swing.

2. In a signaling device, a pivotally mounted normally pendent signaling arm, a crank-arm extending from the pivot thereof, fixed thereto and having a slot therein arranged concentrically to the said pivot and above the same, a pitman having at one end a pin engaging in the slot, a member connected to the other end of the pitman, two separate devices operatively attached to the member, mechanism to operate said devices separately, and a pivotally mounted part operatively engaging the pitman and lying in the path of movement of the member adapted to swing the said pitman independently of the crank-arm toward either end of the said slot in the latter.

3. In a signaling device, a pivotally mounted signaling arm, a crank-arm extending from the pivot thereof, fixed thereto and having a slot therein arranged concentrically to the said pivot and above the same, a pitman having at one end a pin engaging in the slot, a member pivotally connected between its ends to the other end of the pitman, two separate operating devices attached each to one end of the member, mechanism to operate said devices separately, selectively and in successive order, and a pivotally mounted part operatively engaging the pitman and engaged by the member in its movement in either direction to impart initial movement to the pitman within said slot.

4. In a signaling device, a pivotally mounted signaling arm, a crank-arm extending from the pivot thereof, a pitman at one end engaging the crank-arm, a member pivotally connected between its ends to the other end of the pitman, two separate operating devices attached each to one end of the member, and mechanism connected to the pitman and moved by the member to impart initial movement to the signaling arm.

5. In a signaling device, a pivotally mounted signaling arm, a crank-arm extending from the pivot thereof, a pitman at one end engaging the crank-arm, a member pivotally connected between its ends to the other end of the pitman, an operating device attached to each end of the member, and mechanism for separately operating the devices in successive order and for selecting the order of their operation, including a part operatively engaging the pitman and engaged by the member in its movement for initially moving the signaling arm selectively in either direction.

6. In a signaling device, a pivotally mounted signaling arm, a crank-arm fixed to the pivot of the arm for swinging the latter, a pitman at one end engaging the crank-arm, said pitman normally extending across said pivot suspended from said crank-arm, a member pivoted between its ends to the other end of the pitman including a device connected to each end of the member for moving the same and the crank-arm therethrough, said mechanism adapted to operate the member at one end whereby to move the signaling arm through part of its swing followed by its operation at the other end to complete the movement of said signaling arm, and a part operatively connected to the crank-arm engaged by the member in its movement to impart initial movement to the pitman.

7. In a signaling device, a pivotally mounted signaling arm, a crank-arm fixed to the pivot of the arm for swinging the latter, a pitman at one end engaging the crank-arm, said pitman normally extending across the pivot suspended from said crank-arm, a member pivoted between its ends to the other end of the pitman, a guide for directing the line of movement of the point of pivotal connection of the pitman and member, mechanism including a device connected to each end of the member for moving the same and the signaling arm therethrough, said mechanism adapted to operate the member at one end whereby to move the signaling arm through part of its swing followed by its operation at the other end to complete the movement of said signaling arm, and a part operatively connected to the crank-arm engaged by the member in its movement to impart initial movement to the pitman.

8. In a signaling device, a pivotally mounted signaling arm, a crank-arm affixed to the pivot of said arm, a pitman attached at one end to the crank-arm, a member connected between its ends to the other end of the pitman, a guide for the pitman at one end, a device attached to each end of the member, means to separately operate the devices, and a pivotally mounted part operatively connected to the pitman and adapted to be engaged by and in the movement of the member to impart initial movement to said pitman selectively for a selective direction of movement of said signaling arm.

9. In a signaling device, a pivotally mounted signaling arm, a crank-arm affixed to the pivot of the arm, a pitman attached at one end to the crank-arm, a member connected between its ends to the other end of the pitman, a guide for one end of the latter, an armature attached to each end of the member, a magnet for each armature separately controlling the same for moving the said member, both magnets being included in separate electric circuits, a switch adapted for successively closing the circuits in selective order, and a pivotally mounted part operatively connected with the pitman and lying in position to receive pressure of the said member against it whereby to impart initial movement to said pitman and said signaling arm for determining the direction of swing of the latter.

10. In a signaling device, the combination of a pivotally mounted signaling arm normally pendent, a crank-arm fixed with respect to it provided with a notch, a pitman operatively connected with the crank-arm, an operating member connected to the pitman, a device connected to each end of the operating member for operating the same to raise the signaling arm, means to operate the devices first selectively and then in conjunction, a latch normally seated in the notch of the crank-arm and having a part in the path of the operating member adapted to be engaged by the latter to withdraw the latch from the notch prior to the raising of the said signaling arm.

11. In a signaling device, a support, a signaling-arm pivotally mounted thereon depending from its pivot, a crank-arm carried by said pivot, a pitman at one end pivotally engaging the crank-arm at a point above said pivot of the arm, said pitman being normally in line with the pivot, means to guide the pitman at its other end, mechanism connected to the pitman to pull upon the same for raising the arm, and means engaging the pitman and operated by said mechanism to swing the latter selectively to either side of the position of the said pivot of said arm.

In testimony whereof I affix my signature in presence of two witnesses.

CARL C. CAMP.

Witnesses:
J. H. KINGSBURY,
L. M. THURLOW.